United States Patent
Kusuda et al.

(10) Patent No.: US 12,473,933 B2
(45) Date of Patent: Nov. 18, 2025

(54) HYDRAULIC CIRCUIT

(71) Applicants: JATCO LTD, Fuij (JP); Nissan Motor Co., Ltd., Yokohama (JP)

(72) Inventors: Masahiro Kusuda, Kanagawa (JP); Hisao Nobu, Tokyo (JP); Yuki Tawara, Shizuoka (JP); Takahiro Ikeda, Kanagawa (JP); Masayuki Shimizu, Kanagawa (JP); Masanori Satou, Tokyo (JP); Norihiro Ishikawa, Kanagawa (JP); Kenji Kojima, Kanagawa (JP); Kenji Sakakibara, Kanagawa (JP); Daisuke Yanagawa, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/867,078

(22) PCT Filed: May 12, 2023

(86) PCT No.: PCT/JP2023/017940
§ 371 (c)(1),
(2) Date: Nov. 19, 2024

(87) PCT Pub. No.: WO2024/004407
PCT Pub. Date: Jan. 4, 2024

(65) Prior Publication Data
US 2025/0314260 A1    Oct. 9, 2025

(30) Foreign Application Priority Data

Jun. 30, 2022    (JP) ................. 2022-106720

(51) Int. Cl.
*F15B 11/17*    (2006.01)
*F15B 13/02*    (2006.01)
(Continued)

(52) U.S. Cl.
CPC ............ *F15B 13/024* (2013.01); *F15B 11/17* (2013.01); *F15B 20/005* (2013.01);
(Continued)

(58) Field of Classification Search
CPC ........ F15B 11/17; F15B 13/024; F15B 20/00; F15B 20/005; F15B 21/041; F16H 61/00; F16H 61/12
See application file for complete search history.

(56) References Cited

U.S. PATENT DOCUMENTS 8,814,534 B2 *  8/2014  Ikeda ................. F16H 61/0021
                                                    417/44.1
8,833,335 B2 *  9/2014  Karasawa .............. F02D 29/02
                                                    180/338
(Continued)

FOREIGN PATENT DOCUMENTS

CN    109139895 A  *  1/2019  ......... F16H 61/0031
JP    S55-105604 U    7/1980
(Continued)

*Primary Examiner* — Michael Leslie
(74) *Attorney, Agent, or Firm* — Global IP Counselors, LLP

(57) ABSTRACT

A hydraulic circuit includes a first oil path, a second oil path, a hydraulic control circuit, a third oil path, a check valve, and a relief valve. The first oil path links to a discharge port of a first oil pump. The second oil path links to a discharge port of a second oil pump. In the hydraulic control circuit, a first regulator valve is disposed downstream of a confluence point of the first oil path and the second oil path. The third oil path connects a suction port of the first oil pump and a strainer. The check valve is provided in the third oil path and restricts a movement of oil toward the strainer side. The relief valve is provided in the third oil path and discharges oil in the third oil path to an outside when a pressure in the third oil path exceeds a reference pressure.

7 Claims, 10 Drawing Sheets

(51) Int. Cl.
  *F15B 20/00*   (2006.01)
  *F15B 21/041*  (2019.01)
  *F16H 61/00*   (2006.01)

(52) U.S. Cl.
  CPC ....... *F15B 21/041* (2013.01); *F16H 61/0031* (2013.01); *F15B 2211/30505* (2013.01); *F15B 2211/55* (2013.01)

(56) References Cited

U.S. PATENT DOCUMENTS

| | | | |
|---|---|---|---|
| 9,683,631 B2 * | 6/2017 | Takayanagi | F15B 13/027 |
| 9,863,294 B2 * | 1/2018 | Kodama | F16H 61/0031 |
| 9,897,199 B2 * | 2/2018 | Watanabe | F16K 11/07 |
| 10,746,287 B2 * | 8/2020 | Miyamoto | F25B 45/00 |
| 2023/0030147 A1 | 2/2023 | Sugano et al. | |

FOREIGN PATENT DOCUMENTS

| | | |
|---|---|---|
| JP | 3009803 U | 4/1995 |
| JP | 2016-044738 A | 4/2016 |
| JP | 2020-165516 A | 10/2020 |
| JP | 2021-011930 A | 2/2021 |
| WO | 2021/131677 A1 | 7/2021 |

\* cited by examiner

HYDRAULIC CIRCUIT

This application is a U.S. national stage application of International Application No. PCT/JP2023/017940, filed on May 12, 2023. This application also claims priority to Japanese Patent Application No 2022-106720, filed on Jun. 30, 2022.

BACKGROUND

Technical Field

The present invention relates to a hydraulic circuit.

Background Information

A hydraulic fluid supply device for a vehicle is disclosed in Japanese Patent Laid-Open Publication No. 2020-165516.

SUMMARY

In a hydraulic fluid supply device, a mechanical oil pump and an electric oil pump pressurize oil suctioned via a strainer. The pressurized oil is discharged from discharge ports of the mechanical oil pump and the electric oil pump and supplied to a hydraulic control device.

The discharge port of the mechanical oil pump is connected to the hydraulic control device via a first suction pipe. A second suction pipe connected to the discharge port of the electric oil pump is connected to the first suction pipe.

Check valves for preventing the backflow of oil to the mechanical oil pump and the electric oil pump are provided respectively in the first suction pipe and the second suction pipe.

In this type of hydraulic fluid supply device, the mechanical oil pump (mechanical oil pump) is driven, and when the pressure inside the first suction pipe becomes high, there is a possibility of oil (hydraulic fluid) leaking from the check valve to the electric oil pump (electric oil pump) side.

When the electric oil pump is not provided with a mechanism to relieve pressure, pressure rises inside the circuit that connects the electric oil pump and the strainer. In that case, there is the possibility that a gap will occur in a seal part provided in a connection part with the circuit and leakage of the hydraulic fluid will occur.

For that reason, in this type of drive device (power transmission device) provided with two pumps, there is a need to suppress a rise in pressure in the hydraulic circuit.

A mode of the present invention is a hydraulic circuit, that has a first oil path that links to a discharge port of a first oil pump, a second oil path that links to a discharge port of a second oil pump, a hydraulic control circuit in which a first regulator valve is disposed downstream of a confluence point of the first oil path and the second oil path, a third oil path that connects a suction port of the first oil pump and a strainer, and a check valve that is provided in the third oil path and restricts the movement of oil toward the strainer side, and that is configured having a relief valve that is provided in the third oil path and discharges oil in the third oil path to the outside when the pressure in the third oil path exceeds a reference pressure.

According to a mode of the present invention, it is possible to suppress a rise in the pressure of the hydraulic circuit.

BRIEF DESCRIPTION OF THE DRAWINGS

Referring now to the attached drawings which form a part of this original disclosure.

DETAILED DESCRIPTION

First, definitions of terms in the specification are explained.

A power transmission device is a device having at least a power transmission mechanism, where the power transmission mechanism is at least one of a gear mechanism, a differential gear mechanism, and a deceleration mechanism, for example.

In the embodiment hereafter, shown is an example when the power transmission device has a function of transmitting the output rotation of an engine, but the power transmission device may also transmit the output rotation of at least one of the engine and a motor (rotary electric machine).

"Axial direction" means the axial direction of the rotation axis of components constituting the power transmission device. "Radial direction" means the direction orthogonal to the rotation axis of the components constituting the power transmission device. The components are, for example, a motor, a gear mechanism, a differential gear mechanism, etc.

"Vertical placement" of a control valve, in the case of a control valve having a basic structure in which a separation plate is sandwiched between valve bodies, means the valve bodies of the control valve are stacked in the horizontal line direction with the state in which the power transmission device is installed in the vehicle as reference. "Horizontal line direction" here means not the horizontal line direction in the strict meaning, but rather also includes cases when the stacking direction is inclined with respect to the horizontal line direction.

Furthermore, "vertical placement" of the control valve means that the control valve is disposed with a plurality of regulator valves inside the control valve facing aligned in a vertical line VL direction with the state in which the power transmission device is installed in the vehicle as the reference.

"A plurality of regulator valves aligned in a vertical line VL direction" means that the regulator valves in the control valve are disposed with the position skewed in the vertical line VL direction. In this case, the plurality of regulator valves do not have to be disposed with the position completely skewed in the vertical line VL direction. Cases of each regulator valve being aligned in the vertical line VL direction having a range partially overlapping other regulator valves when viewed from the horizontal line direction are also included.

Hereafter, an embodiment of the hydraulic circuit of the present invention is explained using an example when applied to the hydraulic circuit of a power transmission device for a vehicle.

Figure 1:
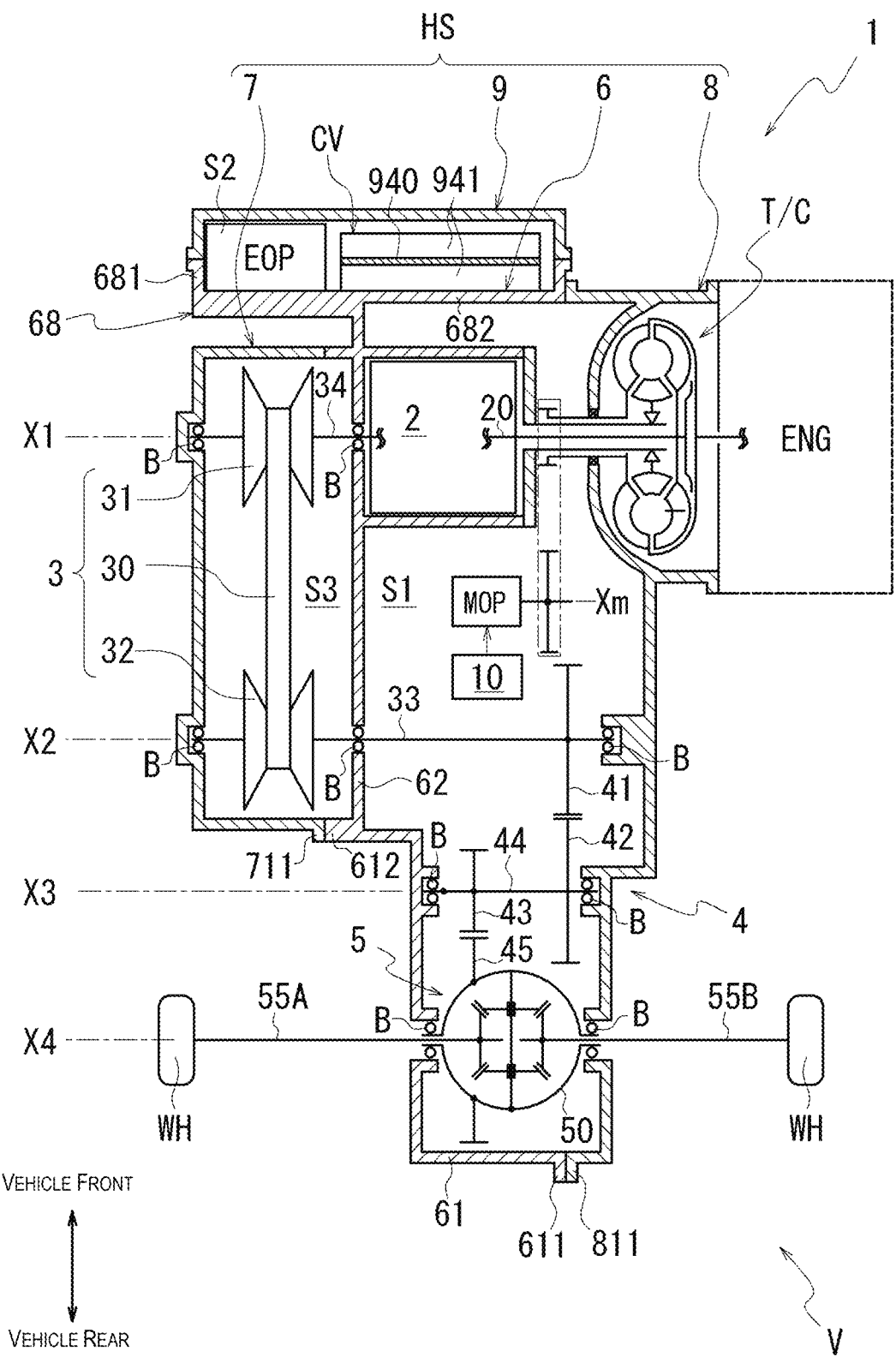
FIG. 1 is a schematic diagram showing the outline configuration of a power transmission device.

FIG. 1 is a schematic diagram explaining the outline configuration of a power transmission device 1 mounted in a vehicle V.

As shown in FIG. 1, a housing HS of the power transmission device 1 is constituted from a case 6, a first cover 7, a second cover 8, and a third cover 9.

Inside the housing HS are housed a torque converter T/C, a forward/reverse switching mechanism 2, a variator 3, a deceleration mechanism 4, a differential device 5, an electric oil pump EOP, a mechanical oil pump MOP, a control valve CV, a strainer 10, etc.

Here, the torque converter T/C, the forward/reverse switching mechanism 2, the variator 3, the deceleration mechanism 4, and the differential device 5 are constituent elements of the power transmission mechanism.

In the power transmission device 1, the output rotation of an engine ENG (drive source) is inputted to the forward/reverse switching mechanism 2 via the torque converter T/C.

The rotation inputted to the forward/reverse switching mechanism 2 is inputted to a primary pulley 31 of the variator 3 by forward rotation or reverse rotation.

In the variator 3, by changing the winding radius of a belt 30 in the primary pulley 31 and a secondary pulley 32, the rotation inputted to the primary pulley 31 is shifted at a desired gear ratio and outputted from an output shaft 33 of the secondary pulley 32.

After being outputted to the differential device 5 (differential gear mechanism) via the deceleration mechanism 4, the output rotation of the secondary pulley 32 is transmitted to drive wheels WH, WH via left and right drive shafts 55A, 55B.

The deceleration mechanism 4 has an output gear 41, an idler gear 42, a reduction gear 43, and a final gear 45.

The output gear 41 rotates together with the output shaft 33 of the secondary pulley 32.

The idler gear 42 is engaged with the output gear 41 with the ability to transmit rotation. The idler gear 42 rotates together with an idler shaft 44. The reduction gear 43 with a smaller diameter than the idler gear 42 is provided on the idler shaft 44. The reduction gear 43 is engaged with the final gear 45 with the ability to transmit rotation, the final gear 45 being fixed to the outer periphery of the differential case 50 of the differential device 5.

In the power transmission device 1, the forward/reverse switching mechanism 2, the torque converter T/C, and the engine ENG output shaft are disposed coaxially (concentrically) on a rotation axis X1 (first axis) of the primary pulley 31.

The output shaft 33 of the secondary pulley 32 and the output gear 41 are disposed coaxially on a rotation axis X2 (second axis) of the secondary pulley 32.

The idler gear 42 and the reduction gear 43 are disposed coaxially on a common rotation axis X3.

The final gear 45, and the drive shafts 55A, 55B are disposed coaxially on a common rotation axis X4. In the power transmission device 1, these rotation axes X1 to X4 are set in a positional relationship in which they will be parallel to each other. Hereafter, as necessary, these rotation axes X1 to X4 will be collectively named, and noted as rotation axis X of the power transmission device 1 (power transmission mechanism).

Figure 2:
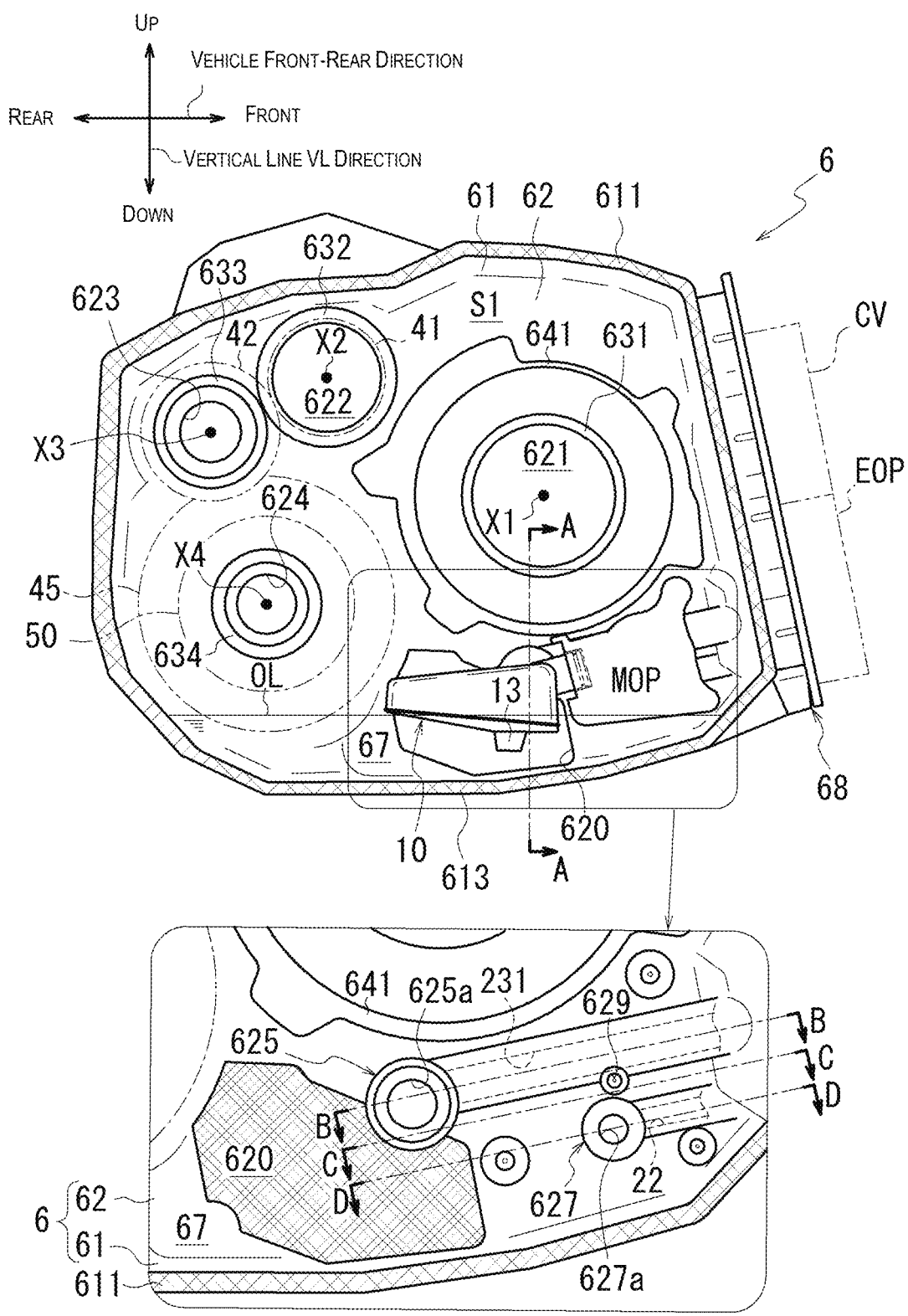
FIG. 2 is a drawing of a case viewed from a second cover side.

FIG. 2 is a schematic diagram showing the state of the case 6 when viewed from the second cover 8 side.

In the enlarged view of FIG. 2, an illustration of the strainer 10 and the mechanical oil pump MOP is omitted, and around connection parts 625, 627 provided on a barrier wall part 62 is shown. Furthermore, in the enlarged view of FIG. 2, to make the position of an opening part 620 easier to understand, cross hatching is shown in the region of the opening part 620.

As shown in FIG. 2, the case 6 has a cylindrical peripheral wall part 61, and the barrier wall part 62.

As shown in FIG. 1, the barrier wall part 62 partitions the space on the inside of the peripheral wall part 61 into two in the rotation axis X1 direction. One side of the barrier wall part 62 in the rotation axis X1 direction is a first chamber S1, and the other side is a third chamber S3.

In the case 6, an opening on the first chamber S1 side is sealed by the second cover 8 (torque converter cover), forming the closed first chamber S1. An opening on the third chamber S3 side is sealed by the first cover 7 (side cover), forming the closed third chamber S3.

The forward/reverse switching mechanism 2, the deceleration mechanism 4, and the differential device 5 are housed in the first chamber S1. The variator 3 is housed in the third chamber S3.

In the case 6, a storage unit 68 that forms a second chamber S2 is attached to the outer periphery of the vehicle front side of the peripheral wall part 61. The storage unit 68 has an opening provided facing the vehicle front side. The opening of the storage unit 68 is sealed by the third cover 9, forming the closed second chamber S2.

The control valve CV and the electric oil pump EOP are disposed in the second chamber S2.

As shown in FIG. 1, the control valve CV has a basic structure in which a separation plate 940 is sandwiched between valve bodies 941, 941. A hydraulic control circuit 95 (see FIG. 8) described later is formed inside the control valve CV. Provided in the hydraulic control circuit 95 are a solenoid that is driven on the basis of a command from a control device (not illustrated), a regulator valve SP (spool valve) that operates by signal pressure, etc., generated by the solenoid, and an oil path.

As shown in FIG. 2, the barrier wall part 62 of the case 6 is provided in a range that crosses the rotation axes (rotation axis X1 to rotation axis X4) of the power transmission mechanism. The barrier wall part 62 is provided facing roughly orthogonally to the rotation axes (rotation axis X1 to rotation axis X4).

Through holes 621, 622, 624 and a support hole 623 are provided in the barrier wall part 62.

The through hole 621 is formed centered on the rotation axis X1. An input shaft 34 (see FIG. 1) of the primary pulley 31 is supported with the ability to rotate by a support wall part 631 surrounding the through hole 621.

A piston (not illustrated) of the forward/reverse switching mechanism 2, and a friction plate (forward clutch, reverse brake) are housed inside a peripheral wall part 641 surrounding the support wall part 631.

The through hole 622 is formed centered on the rotation axis X2.

The output shaft 33 (see FIG. 1) of the secondary pulley 32 is supported to be able to rotate by a peripheral wall part 632 surrounding the through hole 622.

The support hole 623 is a bottomed hole formed centered on the rotation axis X3.

The idler shaft 44 (see FIG. 1) is supported to be able to rotate by a peripheral wall part 633 surrounding the support hole 623.

The through hole 624 is formed centered on the rotation axis X4.

A differential case 50 (see FIG. 1) of the differential device 5 is supported to be able to rotate by a support wall part 634 surrounding the through hole 624.

In this way, the barrier wall part 62 functions as a support wall for the input shaft 34 of the primary pulley 31, the output shaft 33 of the secondary pulley 32, the idler shaft 44, and the differential case 50.

In the case 6, a region that is further to the vehicle front side than the support wall part 634, and that is a region below the abovementioned peripheral wall part 641 serves as a storage unit 67 for the strainer 10 and the mechanical oil pump MOP.

The storage unit 67 is positioned at the bottom part inside the case 6 (housing HS). For that reason, oil OL used for driving or cooling the constituent elements of the power transmission mechanism is stored in the storage unit 67.

Figure 3:
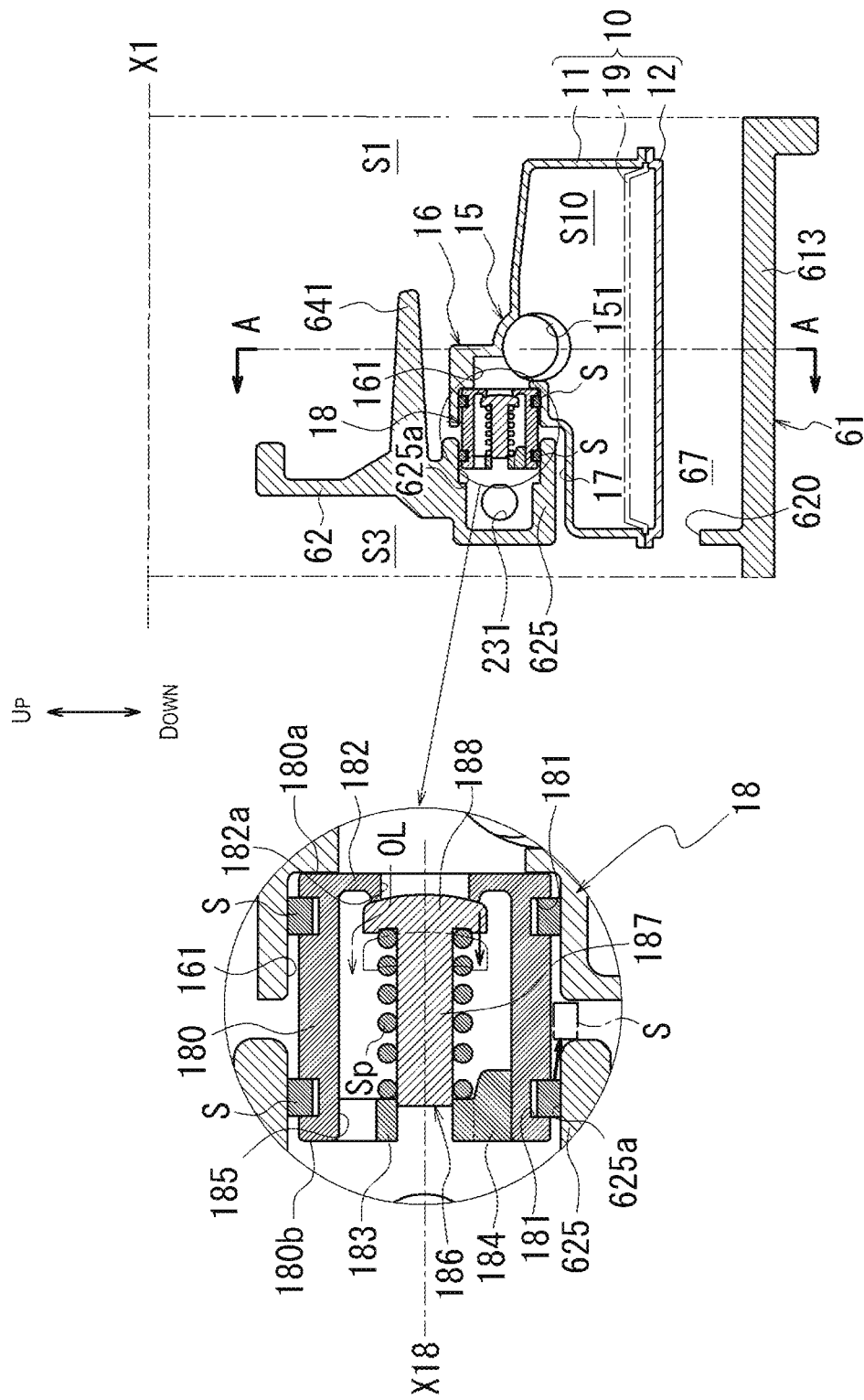
FIG. 3 is a drawing schematically showing a cross sectional view of a housing along line A-A in FIG. 2.

FIG. 3 is a drawing schematically showing a cross sectional view of the housing HS along line A-A in FIG. 2. In this FIG. 3, the connection state of the strainer 10 and the barrier wall part 62 is shown.

As shown in FIG. 3, the storage unit 67 is a bottomed space with the opening facing the first chamber S1 side (right side in FIG. 3). In the bottom part of the case 6, the storage unit 67 is formed in a range that crosses the lower portion of the peripheral wall part 641 that houses the forward/reverse switching mechanism 2, in the rotation axis X1 direction of the power transmission device 1.

The opening part 620 that penetrates the barrier wall part 62 in the rotation axis X1 direction is formed on the bottom part of the barrier wall part 62. The first chamber S1 and the third chamber S3 inside the case 6 are in communication with each other via this opening part 620.

The connection part 625 of the strainer 10 is provided on the lower side of the peripheral wall part 641 in the storage unit 67. The connection part 625 is a cylindrical part in which a connection port 625a faces the second cover 8 side (first chamber S1 side). An oil path 231 is opened at the back side of the connection part 625.

As shown in FIG. 2, the oil path 231 extends in a straight line inside the barrier wall part 62 in the direction away from the opening part 620. The oil path 231 is connected to the electric oil pump EOP housed inside the storage unit 68 via an oil path 232 (see FIG. 9) inside the case 6. Here, a third oil path described later is constituted by the oil path 231 and the oil path 232.

As shown in FIG. 2, in the storage unit 67, the connection part 627 with the mechanical oil pump MOP is provided on the lower side of the oil path 231. A connection port 627a of the connection part 627 is opened facing the same direction as the connection port 625a of the connection part 625 noted above. The connection port 627a of the connection part 627 is linked to an oil path 22 provided inside the barrier wall part 62.

The oil path 22 extends below the abovementioned oil path 231 along the oil path 231 to the storage unit 68 side (right side in the drawing). The oil path 22 is linked to the control valve CV (see FIG. 11) installed inside the storage unit 68. Here, the oil path 22 constitutes a second oil path of the case 6 side described later.

Figure 4:
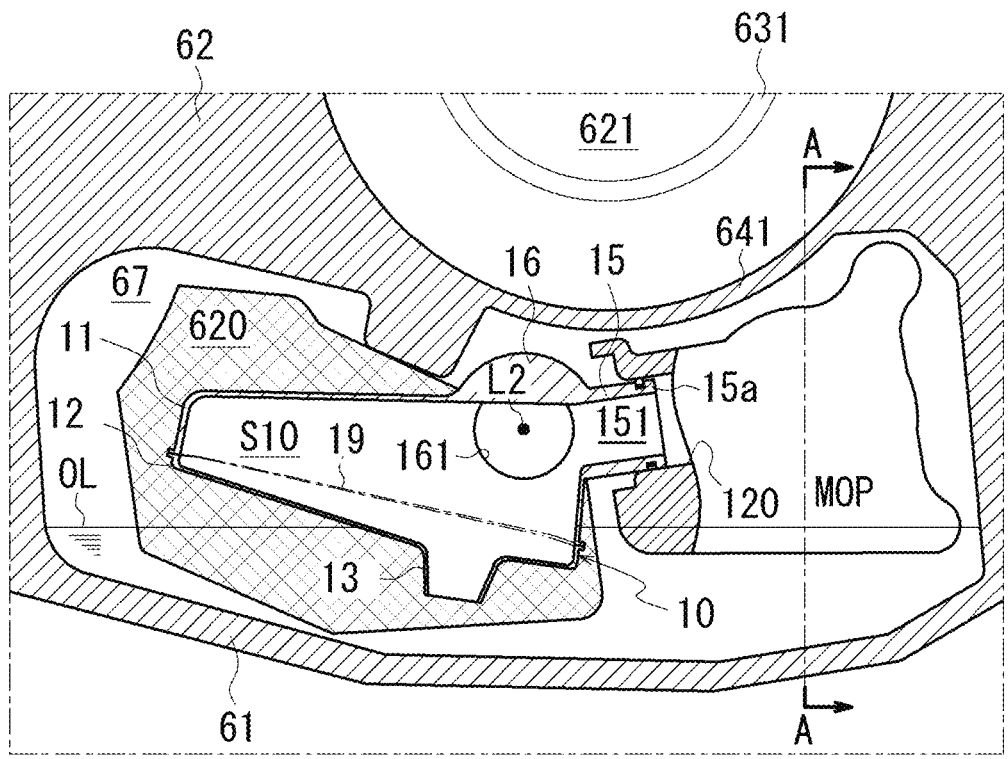
FIG. 4 is a drawing schematically showing a cross sectional view of the housing along line A-A in FIG. 3.

FIG. 4 is a drawing schematically showing a cross sectional view of the housing HS along line A-A in FIG. 3. In this FIG. 4, the disposition of the strainer 10 and the mechanical oil pump MOP in the storage unit 67 is shown schematically.

Figure 5:
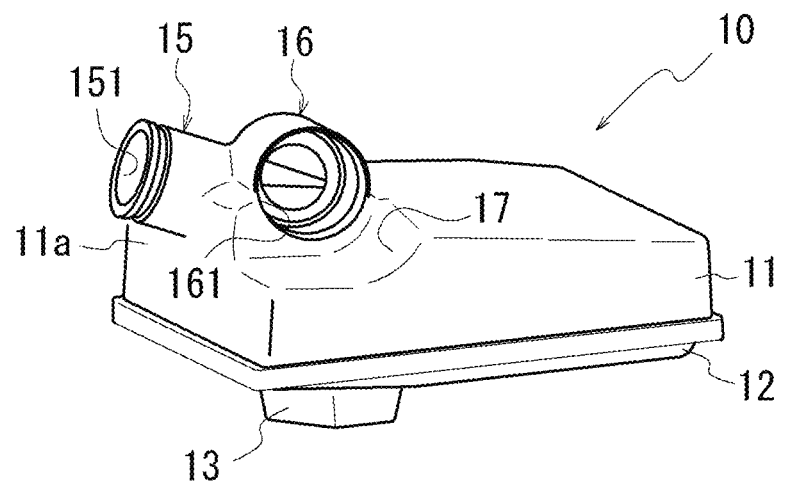
FIG. 5 is a perspective view of a strainer viewed from above an upper case side.

FIG. 5 is a perspective view of the strainer 10 when viewed from above an upper case 11 side.

As shown in FIG. 3 and FIG. 4, the strainer 10 has a basic structure in which a filter 19 is disposed inside a space S10 formed between the upper case 11 and a lower case 12.

As shown in FIG. 5, a first connection part 15 is provided on one side part 11a of the upper case 11. The first connection part 15 is a cylindrical member having an oil discharge passage 151 inside. A second connection part 16 is provided on the base side of the first connection part 15. As shown in FIG. 3, the second connection part 16 forms a bottomed cylinder having an oil OL discharge passage 161 inside.

The first connection part 15 and the second connection part 16 are provided in a direction in which the opening directions of discharge passages 151, 161 are orthogonal. The discharge passage 161 inside the second connection part 16 and the discharge passage 151 inside the first connection part 15 are linked to the space S10 inside the strainer 10.

As shown in FIG. 5, in the upper case 11, a recess 17 recessed to the lower case 12 side is provided in a region positioned on the extension of the discharge passage 161 inside the second connection part 16. For that reason, as shown in FIG. 3, a check valve 18 can be inserted from the strainer 10 side to inside the discharge passage 161 without interfering with the upper case 11.

As shown in FIG. 3, the check valve 18 has a cylindrical body part 180 and a valve body 186.

A one end 180a side of the body part 180 in the longitudinal direction is fitted into the discharge passage 161 of the strainer 10 side. An other end 180b side of the body part 180 in the longitudinal direction is fitted into the connection part 625 of the barrier wall part 62 side.

Recessed grooves 181, 181 are provided on the outer periphery of the one end 180a side and the outer periphery of the other end 180b side of the body part 180. Seal rings S, S are externally fitted on the recessed grooves 181, 181. The seal ring S of the one end 180a side seals the gap between the outer periphery of the body part 180 and the inner periphery of the discharge passage 161. The seal ring S of the other end 180b seals the gap between the outer periphery of the body part 180 and the inner periphery of the connection port 625a of the connection part 625.

The body part 180 of the check valve 18 functions as a connection member that connects the strainer 10 and the connection part 625 of the barrier wall part 62 side.

The valve body 186 is provided to be displaceable in an axis line X18 direction (left-right direction in the drawing) in the interior of the body part 180. The axis line X18 is a straight line along the longitudinal direction of the body part 180. The axis line X18 is a straight line along the direction for assembling the strainer 10 to the barrier wall part 62.

In the body part 180, a ring form wall part 182 is provided on the one end 180a in the longitudinal direction. A through hole 182a that penetrates the wall part 182 in the thickness direction is provided at the center of the wall part 182.

In the body part 180, a support tube 183 is provided at the other end 180b in the longitudinal direction. The support tube 183 is disposed concentrically on the body part 180. The support tube 183 is supported by a support beam 184 extending from the inner periphery of the body part 180. A plurality of the support beams 184 are provided at intervals in the circumferential direction around the axis line X18 of the body part 180. Between adjacent support beams 184, 184 in the circumferential direction around the axis line X18 becomes an opening part 185 through which the oil OL can pass.

A shaft part 187 of the valve body 186 is inserted in the support tube 183 from the axis line X18 direction.

In the valve body 186, an abutting part 188 having a larger diameter than the shaft part 187 is provided on one end of the shaft part 187. A spring Sp is externally inserted on the shaft part 187. One end of the spring Sp is abutting the abutting part 188 from the axis line X18 direction. The other end of the spring Sp is abutting the support tube 183 from the axis line X18 direction. The spring Sp is positioned by the support tube 183. The spring Sp energizes the abutting part 188 of the valve body 186 to the wall part 182 side (right side in the drawing). The abutting part 188 of the valve body 186 is abutting the wall part 182 by the energizing force of the spring Sp. The through hole 182a in the center of the wall part 182 is closed by the abutting part 188.

In the power transmission device 1, when the electric oil pump EOP is driven, oil stored at the bottom part inside the housing HS is suctioned via the strainer 10. The valve body 186 is displaced in the direction away from the wall part 182 by negative pressure generated by driving of the electric oil pump EOP. As a result, sealing of the through hole 182a is cancelled, and the oil OL suctioned via the strainer 10 is suctioned into the oil path 231 through the through hole 182a. The suctioned oil OL is finally supplied to the electric oil pump EOP.

As shown in FIG. 4, in the strainer 10, a tip 15a side of the first connection part 15 is inserted into a connection port 120 on the mechanical oil pump MOP side, and is assembled to the mechanical oil pump MOP. The mechanical oil pump MOP is able to be assembled to the barrier wall part 62, and the strainer 10 is supported on the barrier wall part 62 via the mechanical oil pump MOP.

Figure 6:
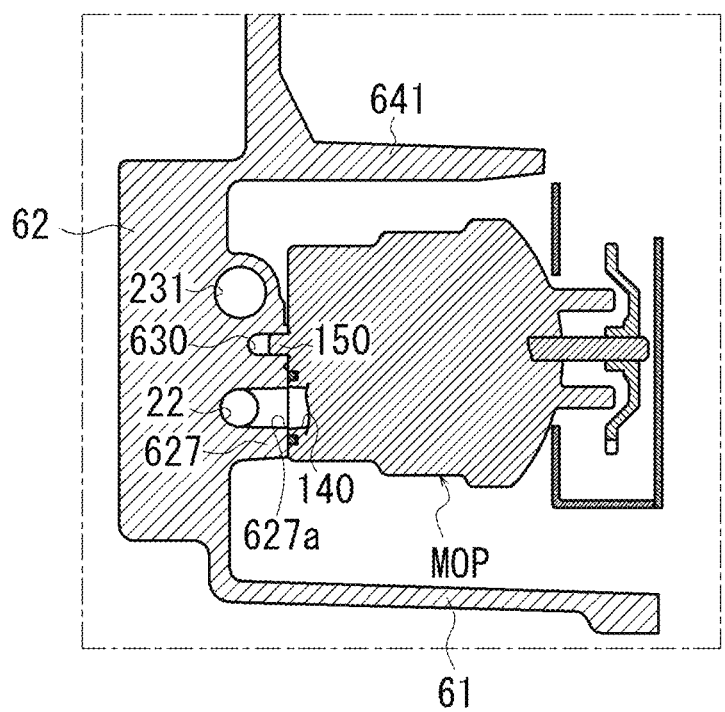
FIG. 6 is a drawing for explaining a support structure of a mechanical oil pump in a barrier wall part.

FIG. 6 is a drawing for explaining the support structure of the mechanical oil pump MOP in the barrier wall part 62. This FIG. 6 schematically shows a cross sectional view the mechanical oil pump MOP along line A-A in FIG. 4.

As shown in FIG. 6, a projection 150 for positioning, and a discharge part 140 for the oil OL are provided on the opposing part to the barrier wall part 62 in the mechanical oil pump MOP.

In the barrier wall part 62, an insertion hole 630 and the connection part 627 are opened on the opposing surface to the mechanical oil pump MOP.

By inserting the projection 150 in the insertion hole 630 of the barrier wall part 62, the mechanical oil pump MOP is positioned in a prescribed position on the barrier wall part 62. In this state, the mechanical oil pump MOP is secured to the barrier wall part 62 using bolts (not illustrated).

When the mechanical oil pump MOP is secured to the barrier wall part 62, the discharge port 140 of the mechanical oil pump MOP is disposed at a position facing the connection part 627 on the barrier wall part 62, and the discharge port 140 and the connection part 627 are in communication. The connection part 627 is linked to the oil path 22 inside the barrier wall part 62. For that reason, the oil OL discharged from the discharge port 140 of the mechanical oil pump MOP passes through the connection part 627 and is supplied to inside the oil path 22. The oil OL supplied to the oil path 22 is supplied to the control valve CV inside the storage unit 68 (see FIG. 11).

When this mechanical oil pump MOP is secured to the barrier wall part 62, substantially simultaneously, the second connection part 16 of the strainer 10 is connected to the connection part 625 on the barrier wall part 62 side via the check valve 18.

In this state, in the strainer 10, the first connection part 15 is supported by the mechanical oil pump MOP, and the second connection part 16 is attached to the barrier wall part 62 via the check valve 18 (body part 180) in which the second connection part 16 is inserted.

Figure 7:
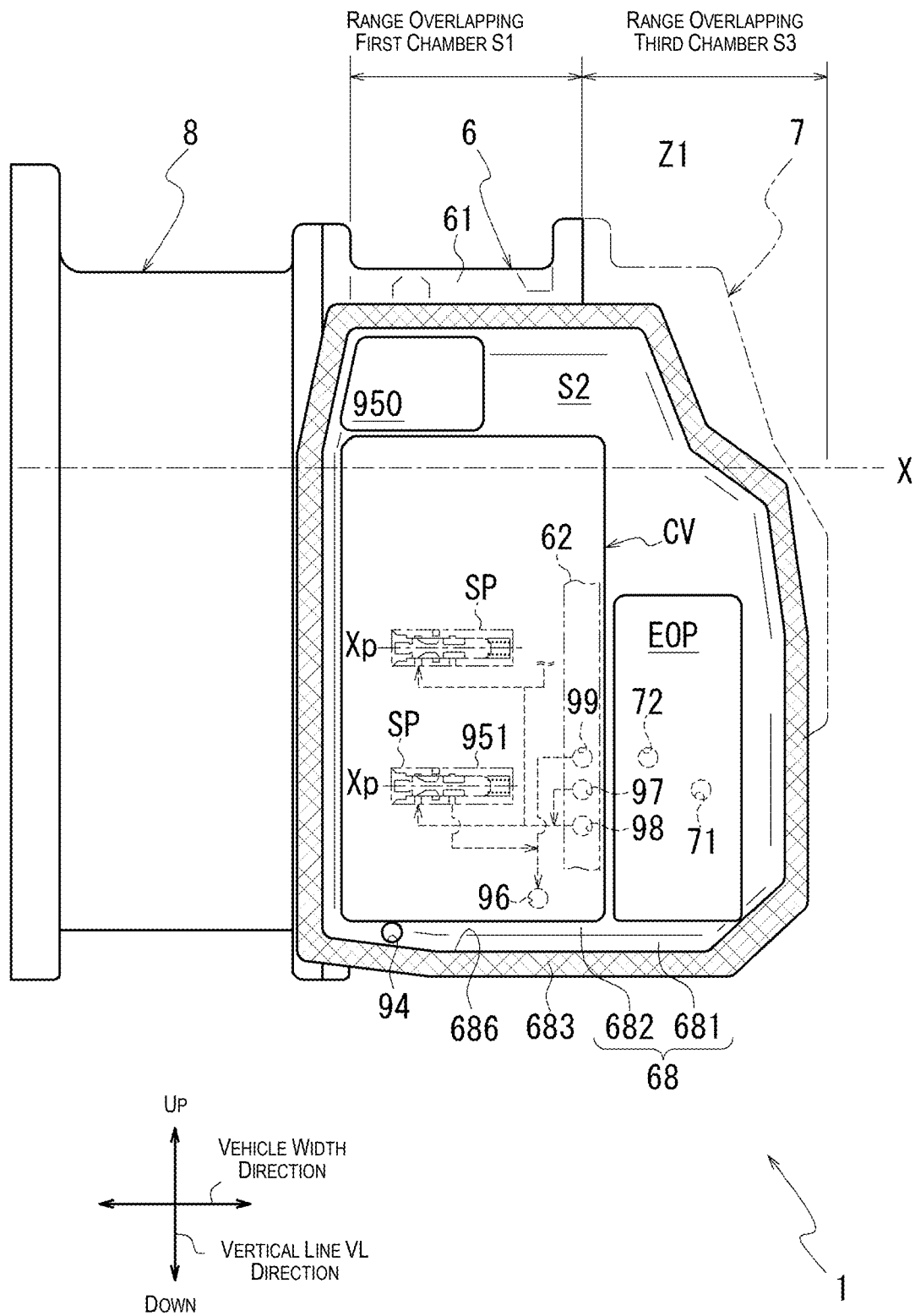
FIG. 7 is a drawing of a storage unit viewed from a vehicle front side.

FIG. 7 is a drawing of the storage unit 68 viewed from the vehicle front side. In this FIG. 7, the second chamber S2 viewed from the vehicle front side is schematically shown together with other constituent elements of the housing HS (case 6, first cover 7, second cover 8). A junction part 683 region positioned on the front side of the page is shown with cross hatching. The external appearance of the control valve CV and the external appearance of the electric oil pump EOP are shown schematically.

As shown in FIG. 7, the storage unit 68 viewed from the vehicle front side has a peripheral wall part 681 surrounding along the entire circumference of the outer periphery of the second chamber S2. In the wall part 682 of the inside of the peripheral wall part 681, a region that overlaps the first chamber S1 also serves as a partition wall that partitions the second chamber S2 and the first chamber S1. The end face of the paper front side of the peripheral wall part 681 serves as the junction part 683 with the third cover 9.

As shown in FIG. 1, the storage unit 68 is provided facing along the rotation axis X of the power transmission device 1. The storage unit 68 is formed having a range of the rotation axis X direction (left-right direction in the drawing) including up to the side of the first cover 7 from the region adjacent to the peripheral wall part 61 of the case 6.

Inside the storage unit 68 (second chamber S2), the control valve CV is vertically placed oriented with the stacking direction of the valve bodies 941, 941 matching the vehicle front-back direction (paper surface, vertical direction).

For that reason, as shown in FIG. 7, in the second chamber S2, the control valve CV is vertically placed to satisfy the following conditions. (a) A plurality of the regulator valves SP (spool valves) inside the control valve CV are aligned in the vertical line VL direction (vertical direction) using the state of the power transmission device 1 being installed in the vehicle V for reference, and (b) an advance-retreat movement direction Xp of the regulator valves SP (spool valves) is oriented along the horizontal line direction.

As a result, while making sure there is no obstruction of the advance-retreat movement of the regulator valves SP (spool valves), the control valve CV is vertically placed inside the second chamber S2. Thus, the second chamber S2 is made to not become larger in the vehicle front-back direction.

As shown in FIG. 7, a discharge port 96 for the oil OL is provided in the control valve CV. The oil OL drained from each regulator valve SP is discharged from the discharge port 96.

For that reason, the oil OL discharged from the discharge port 96 is stored inside the second chamber S2 that houses the control valve CV.

In the second chamber S2, a communication hole 94 is opened at the bottom part of the region overlapping the first chamber S1 in the wall part 682. An opening 950 is provided on the top part of the region overlapping the first chamber S1 in the wall part 682.

The communication hole 94 and the opening 950 respectively connect the first chamber S1 and the second chamber S2. For that reason, the oil OL inside the second chamber S2 returned to the first chamber S1 through the communication hole 94.

Inside the second chamber S2, the control valve CV and the electric oil pump EOP are aligned in the rotation axis X direction (left-right direction in FIG. 7). Viewed from the vehicle front side, the control valve CV is provided in a positional relationship overlapping the first chamber S1. Viewed from the vehicle front side, the electric oil pump EOP is provided in a positional relationship overlapping the third chamber S3.

The electric oil pump EOP has a discharge port 71 for the oil OL and a suction port 72 for the oil OL on the opposing part to the wall part 682 on the paper back side.

The suction port 72 is linked to the connection part 625 with the strainer 10 via an oil path 23 (see FIG. 9) provided inside the wall part 682.

The discharge port 71 is linked to a connection port 97 with the control valve CV via an oil path 21 (see FIG. 10) provided inside the wall part 682.

Figure 8:
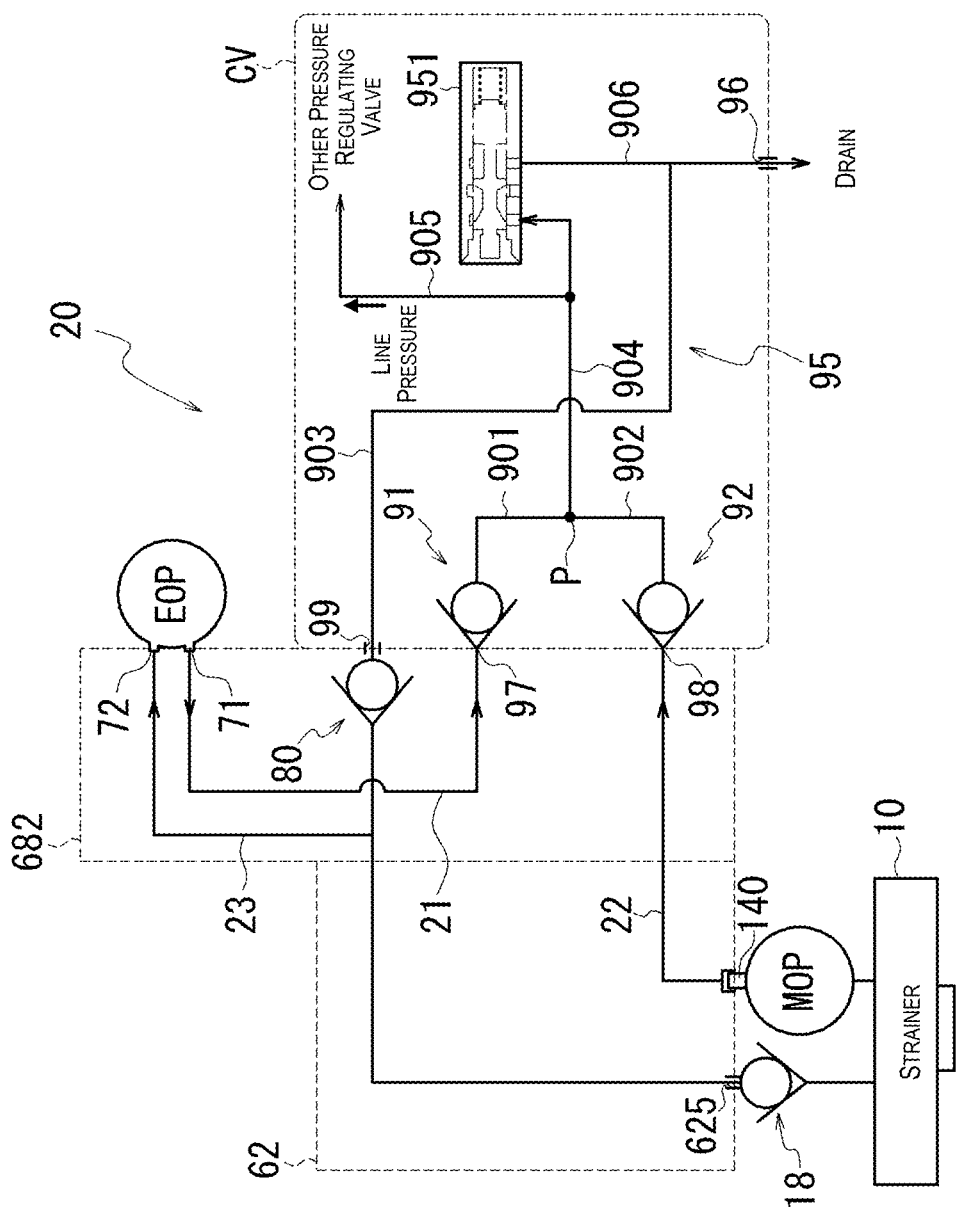
FIG. 8 is an outline configuration diagram of a hydraulic circuit.

FIG. 8 is an outline configuration diagram of the hydraulic circuit 20 of the power transmission device 1.

Figure 9:
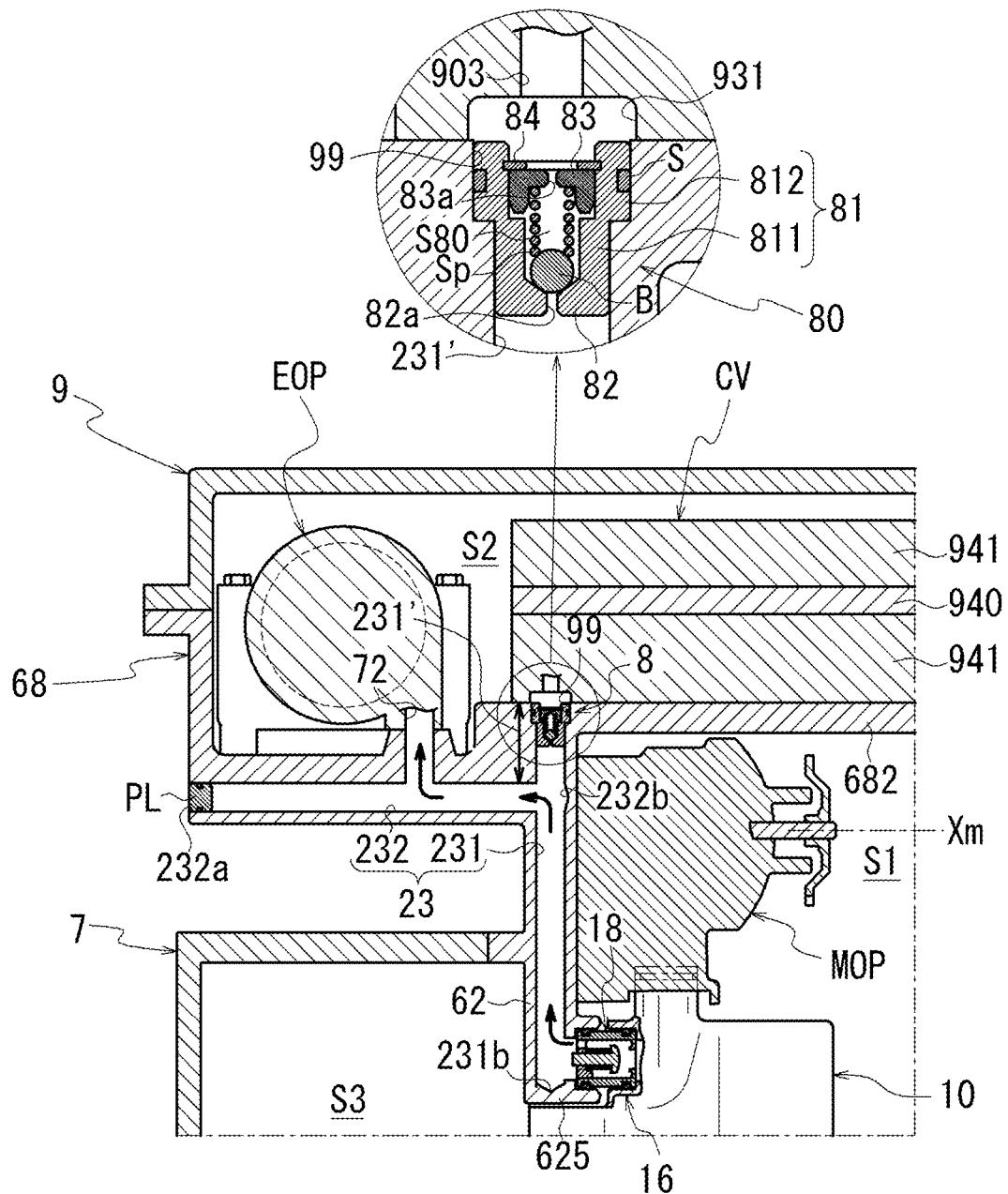
FIG. 9 is a drawing schematically showing the cross section of the housing to explain a third oil path.

FIG. 9 is a drawing schematically showing a cross section of the housing HS to explain the third oil path. This FIG. 9 correlates to a cross sectional view of the housing HS cut along line B-B in FIG. 2.

Figure 10:
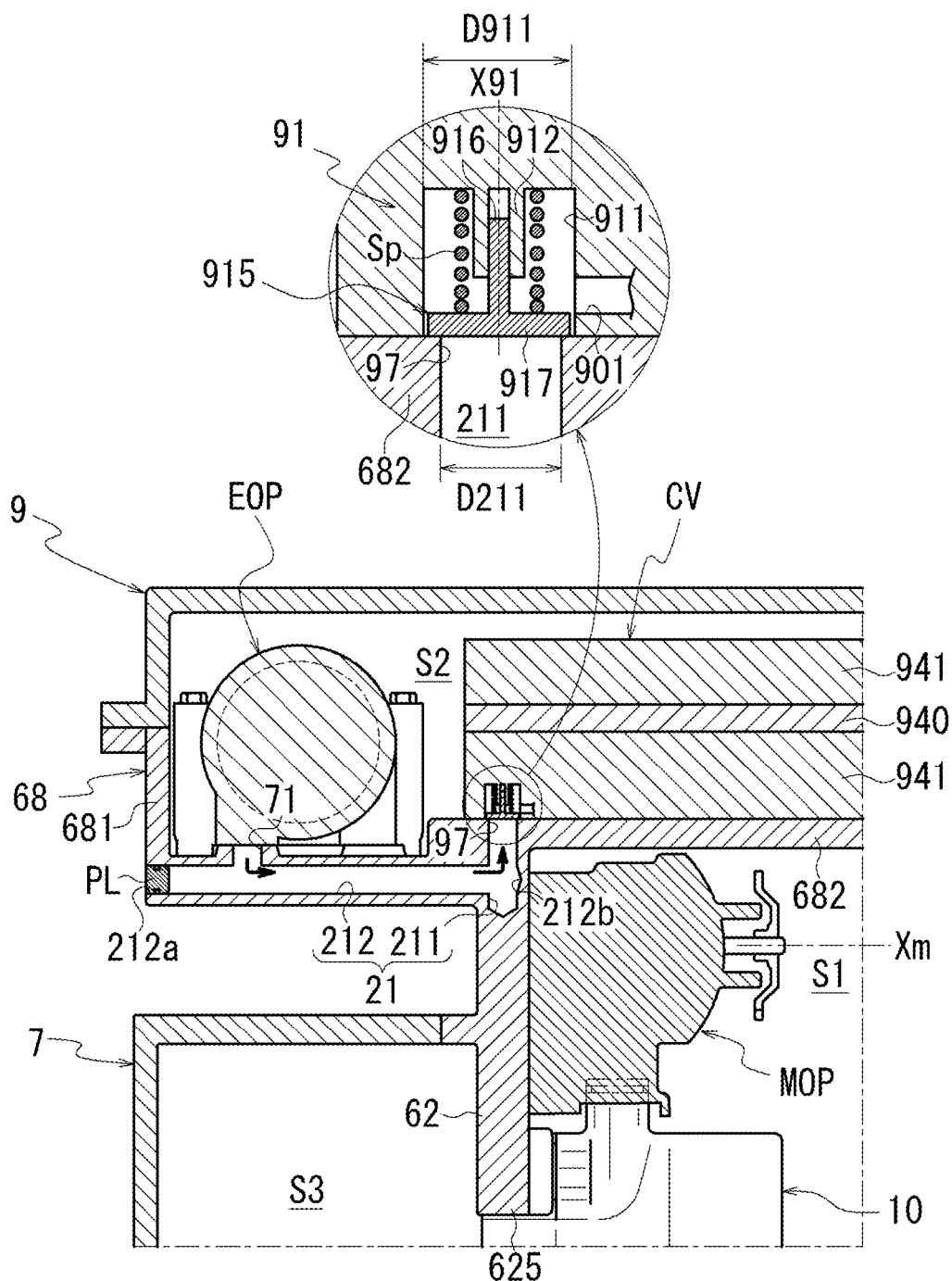
FIG. 10 is a drawing schematically showing the cross section of the housing to explain a first oil path.

FIG. 10 is a drawing schematically showing a cross section of the housing HS to explain the first oil path. This FIG. 10 correlates to a cross section of the housing HS cut along line C-C in FIG. 2.

Figure 11:
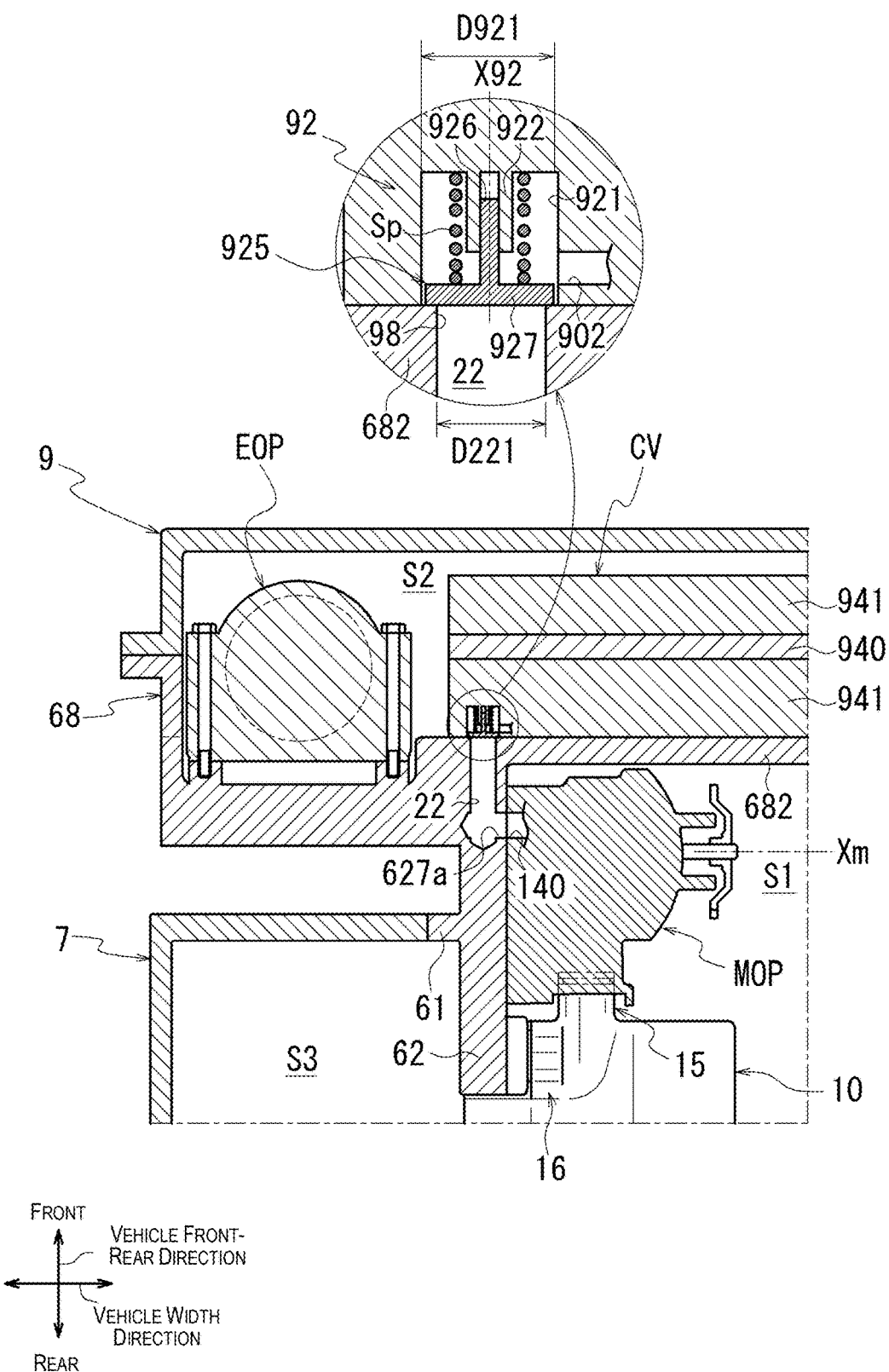
FIG. 11 is a drawing schematically showing the cross section of the housing to explain a second oil path.

FIG. 11 is a drawing schematically showing a cross section of the housing HS to explain the second oil path. This FIG. 11 correlates to a cross section of the housing HS cut along line D-D in FIG. 2.

As shown in FIG. 8, the hydraulic circuit 20 of the power transmission device 1 is provided with one each of the mechanical oil pump MOP and the electric oil pump EOP. These oil pumps (mechanical oil pump MOP and electrical oil pump EOP) suction the oil OL stored at the bottom part inside the housing HS (first chamber S1, third chamber S3) via the shared strainer 10. The suctioned oil OL, after being pressurized, is supplied to the hydraulic control circuit 95 inside the control valve CV.

In the explanation hereafter, when there is no particular distinction made between the mechanical oil pump MOP and the electric oil pump EOP, they are simply noted as "oil pump OP."

The hydraulic circuit 20 further has the first oil path (oil path 21, first connection path 901), the second oil path (oil path 22, second connection path 902), the third oil path (oil path 23, third connection path 903), and the hydraulic control circuit 95. The first oil path and the second oil path are confluent at a confluence point P inside the control valve CV.

As shown in FIG. 8, the first oil path is configured from the oil path 21 on the case 6 side (wall part 682, barrier wall part 62), and the first connection path 901 on the control valve CV side.

The oil path 21 is the oil path that connects the discharge port 71 of the electric oil pump EOP (first oil pump) and the connection port 97 with the control valve CV.

As shown in FIG. 10, the oil path 21 is configured from an oil path 211 extending in a straight line inside the barrier wall part 62 and an oil path 212 extending in a straight line inside the wall part 682.

The oil path 211 is a blind hole formed facing orthogonally to a rotation axis Xm of the mechanical oil pump MOP.

The base end of the oil path 211 serves as the connection port 97 that opens to the second chamber S2.

The oil path 212 is a blind hole formed facing along the rotation axis Xm. Here, the rotation axis Xm is parallel to the rotation axis X of the power transmission device 1.

A base end 212a of the oil path 212 is sealed by a plug PL. A tip 212b of the oil path 212 intersects the oil path 211 inside the barrier wall part 62.

Here, a blind hole is a dead end hole which is open at the base end is not open at the tip.

In the control valve CV, a connection part 911 of the first connection path 901 is open on the opposing part to the connection port 97 of the oil path 211.

The connection part 911 is a bottomed hole with the opening formed facing the wall part 682 side. The connection part 911 is formed with an inner diameter D911 greater than an inner diameter D211 of the oil path 211.

A valve body 915 is provided on the connection part 911. The valve body 915 is constituted from a cylindrical shaft part 916, and an abutting part 917 provided at one end of the shaft part 916.

The shaft part 916 is supported by a cylindrical support part 912 provided on the connection part 911 to be able to move in an axis line X91 direction along the opening direction of the oil path 211.

The spring Sp is externally inserted on the support part 912 and the shaft part 916. The valve body 915 is energized to the wall part 682 side by the energizing force of the spring Sp.

An abutting part 917 is formed with a larger outer diameter than the oil path 211. When the abutting part 917 abuts the wall part 682, the abutting part 917 is held in a state pressed against the outer periphery edge surrounding the opening of the oil path 211 by the energizing force of the spring Sp.

In this state, the abutting part 917 contacts the wall part 682 in a metal touch state, and the link between the oil path 211 and the first connection path 901 of the hydraulic control circuit 95 side is blocked.

During driving of the electric oil pump EOP, the valve body 915 is pressed by the oil OL supplied from the oil path 211, and is displaced in the direction away from the wall part 682. As a result, the sealing of the oil path 211 is cancelled, and the oil OL supplied from the electric oil pump EOP side is supplied to a line pressure regulator valve 951 (see FIG. 8) side through the first connection path 901 inside the control valve CV.

Here, the first connection path 901 through which oil OL from the electric oil pump EOP flows is confluent with the second connection path 902 through which the oil OL from the mechanical oil pump MOP flows between the connection part 911 and the line pressure regulator valve 951.

For that reason, during driving of the mechanical oil pump MOP, the oil OL flows through the first connection path 901 from the second connection path 902 into the connection part 911.

Here, when the electric oil pump EOP is not being driven, the valve body 915 seals the opening of the oil path 211, so inflow of the oil OL to the oil path 211 on the electric oil pump EOP side is restricted.

As shown in FIG. 8, a second oil path is constituted from the oil path 22 on the case 6 side (wall part 682, barrier wall part 62), and the second connection path 902 on the control valve CV side.

The oil path 22 is an oil path that connects the discharge port 140 of the mechanical oil pump MOP (second oil pump) and a connection port 98 of the control valve CV.

As shown in FIG. 11, the oil path 22 is an oil path extending in straight line form inside the barrier wall part 62. The oil path 22 is a blind hole formed oriented orthogonally to the rotation axis Xm of the mechanical oil pump MOP. The base end of the oil path 22 serves as the connection port 98 that opens to the second chamber S2.

In the control valve CV, a connection part 921 of the second connection path 902 is opened at the opposing part to the connection port 98 of the oil path 22.

The connection part 921 is a bottomed hole with the opening formed facing the wall part 682 side. The connection part 921 is formed with an inner diameter D921 greater than an inner diameter D221 of the oil path 22.

A valve body 925 is provided on the connection part 921. The valve body 925 is constituted from a cylindrical shaft part 926 and an abutting part 927 provided at one end of the shaft part 926.

The shaft part 926 is supported to be movable in an axis line X92 direction along the opening direction of the oil path 22 by a cylindrical support part 922 provided on the connection part 921.

The spring Sp is externally inserted on the support part 922 and the shaft part 926. The valve body 925 is energized to the wall part 682 side by the energizing force of the spring Sp.

The abutting part 927 is formed with a larger outer diameter than the oil path 22. When the abutting part 927 abuts the wall part 682, the abutting part 927 is held in a state pressed against the outer peripheral edge surrounding the opening of the oil path 22 by the energizing force of the spring Sp.

In this state, the abutting part 927 is in contact with the wall part 682 in a metal touch state, blocking the link between the oil path 22 and the second connection path 902 on the hydraulic control circuit 95 side.

During driving of the mechanical oil pump MOP, the valve body 925 is pressed by the oil OL supplied from the oil path 22, and is displaced in the direction away from the wall part 682. As a result, sealing of the oil path 22 is cancelled, and the oil OL supplied from the mechanical oil pump MOP side is supplied to the line pressure regulator valve 951 (see FIG. 8) through the second connection path 902 inside the control valve CV.

Here, the second connection path 902 through which the oil OL from the mechanical oil pump MOP flows is confluent with the first connection path 901 through which the oil OL flows from the electric oil pump EOP between the connection part 921 and the line pressure regulator valve 951.

For that reason, during driving of the electric oil pump EOP, the oil OL flows through the second connection path 902 from the first connection path 901 into the connection part 921.

Here, when the mechanical oil pump MOP is not being driven, the valve body 925 seals the opening of the oil path 22, so inflow of the oil OL to the oil path 22 on the electric oil pump EOP side is restricted.

In this way, with the control valve CV, a check valve 91 is provided on the connection part with the oil path 21 (oil path 211) in the first connection path 901. Furthermore, a check valve 92 is provided in the connection part with the oil path 22 in the second connection path 902.

The first connection path 901 and the second connection path 902 are oil paths provided inside the control valve CV, and constitute a portion of the hydraulic control circuit 95 inside the control valve CV.

As shown in FIG. 8, an oil path 904 beyond the confluence point P of the first connection path 901 and the second connection path 902 is connected to the line pressure regulator valve 951. In the oil path 904, an oil path 905 connected to another regulator valve is connected between the confluence point P and the line pressure regulator valve 951.

The hydraulic control circuit 95 inside the control valve CV regulates the hydraulic fluid pressure of the power transmission mechanism (forward/reverse switching mechanism 2, variator 3, etc.) from the hydraulic pressure generated by the oil pump OP.

The line pressure regulator valve 951 is a regulator valve to which the oil OL is first supplied in the hydraulic control circuit 95. The line pressure regulator valve 951 adjusts the hydraulic pressure (line pressure) supplied to another regulator valve to which the oil path 905 is connected by adjusting the drain amount of the oil OL in the line pressure regulator valve 951.

An oil path 906 extending from the discharge port 96 of the oil OL is connected to the drain port of the line pressure regulator valve 951. The oil OL discharged from the line pressure regulator valve 951 passes through the oil path 906 and is discharged from the discharge port 96 to inside the second chamber S2.

The third connection path 903 is connected to this oil path 906. For that reason, the oil OL discharged from a relief valve 80 of the oil path 23 is supplied to the oil path 906 through the third connection path 903.

As shown in FIG. 8, the third oil path is configured from the oil path 23 on the case 6 (wall part 682, barrier wall part 62) side, and the third connection path 903 on the control valve CV side.

The oil path 23 is an oil path that connects the suction port 72 of the electric oil pump EOP (first oil pump) and the strainer 10.

As shown in FIG. 9, the oil path 23 is configured from the oil path 231 extending in straight line form through the barrier wall part 62, and the oil path 232 extending in straight line form through the wall part 682.

The oil path 231 is a blind hole formed oriented orthogonally to the rotation axis Xm of the mechanical oil pump MOP. The base end of the oil path 231 serves as a connection port 99 that opens to the second chamber S2.

The oil path 232 is a blind hole formed facing along the rotation axis Xm of the mechanical oil pump MOP.

The opening on a base end 232a side of the oil path 232 is sealed by the plug PL. A tip 232b of the oil path 232 intersects the oil path 231 inside the barrier wall part 62. In the oil path 231, the connection port 99 side of the region in which the oil path 231 and the oil path 232 intersect serves as a branch passage 231'.

In the control valve CV, a connection part 931 of the third connection path 903 is opened in the opposing part to the connection port 99 (branch passage 231') of the oil path 231.

In the region of the branch passage 231' in the oil path 231, the relief valve 80 is inserted and disposed in the connection port 99 part. The relief valve 80 has a base 81 fitted inside the connection port 99. The base 81 has a small diameter part 811 and a large diameter part 812. In the small diameter part 811, a wall part 82 is provided on the side opposite to the large diameter part 812. The base 81 is formed into a bottomed cylinder in which the small diameter part 811 side is closed by the wall part 82.

A through hole 82a is provided in the wall part 82. The through hole 82a penetrates the wall part 82 in the thickness direction, and connects the oil path 231 and a space S80 inside the base 81.

A support member 83 of the spring Sp is inserted in a region of the inside of the large diameter part 812 in the space S80.

The support member 83 is positioned by a snap ring 84 engaged with the inner periphery of the large diameter part 812, and movement in the direction away from the small diameter part 811 is restricted by the snap ring 84.

One end of the spring Sp abuts the surface on the small diameter part 811 side in the support member 83. The other end of the spring Sp abuts a ball B. The ball B is pressure fitted to the wall part 82 by the energizing force of the spring Sp, and the through hole 82*a* provided in the wall part 82 is sealed by the ball B.

A discharge port 83*a* is provided in the center of the support member 83. The discharge port 83*a* connects the space S80 in which the ball B is housed with the connection part 931.

The seal ring S is externally fitted on the outer periphery of the large diameter part 812. The seal ring S seals the gap between the outer periphery of the large diameter part 812 and the inner periphery of the connection port 99.

In the relief valve 80, when the pressure inside the oil path 23 (oil path 231) reaches a reference pressure or greater, the ball B moves in the direction away from the wall part 82 while compressing the spring Sp. As a result, sealing of the through hole 82*a* by the ball B is canceled, and the oil OL inside the oil path 23 is discharged from the discharge port 83*a* of the relief valve 80 to the third connection path 903 on the control valve CV side.

As noted above, the third connection path 903 is linked to the oil path 906 that connects the drain port of the line pressure regulator valve 951 and the oil OL discharge port 96 (see FIG. 8).

For that reason, the oil OL discharged to the third connection path 903 from the relief valve 80 is finally discharged from the discharge port 96 of the control valve CV into the second chamber S2 (see FIG. 7).

In the case 6 as shown in FIG. 7, the connection port 99 of the oil path 23, the connection port 97 of the oil path 21 noted above, and the connection port 98 of the oil path 22 noted above are disposed aligned vertically in the region overlapping the barrier wall part 62 of the wall part 682.

These connection ports 97, 98, 99 are provided in a positional relationship overlapping the control valve CV.

For that reason, the connection ports 97, 98, 99 are made to have connection of each of the connection paths (901, 902, 903) on the control valve CV side completed approximately simultaneously with installation of the control valve CV to the second chamber S2.

Hereafter, the effect of the hydraulic circuit 20 is explained.

In the hydraulic circuit 20, when the electric oil pump EOP is not being driven, the valve body 915 of the check valve 91 seals the opening of the oil path 211 (see FIG. 10). For that reason, the inflow of the oil OL to the oil path 211 (oil path 21) on the electric oil pump EOP side is restricted.

When the mechanical oil pump MOP is driven in this state, the valve body 925 of the check valve 92 (see FIG. 11) is pressed by the oil OL supplied from the oil path 22, and is displaced in the direction away from the wall part 682. As a result, sealing of the oil path 22 is canceled, and the oil OL supplied from the mechanical oil pump MOP side passes through the oil path 22 and the second connection path 902 within the control valve CV, and is supplied to the line pressure regulator valve 951 (see FIG. 8) side.

As noted above, the second connection path 902 is confluent with the first connection path 901 within the hydraulic control circuit 95. For that reason, when the mechanical oil pump MOP is driven, the oil OL flows into the connection part 911 (see FIG. 10) in which the check valve 91 is provided.

That being done, the pressure inside the connection part 911 rises due to the inflow of oil. Here, the abutting part 917 of the valve body 915 of the check valve 91 is in contact with the wall part 682 in a metal touch state. For that reason, when the pressure inside the connection part 911 increases, through the contact interface between the abutting part 917 and the wall part 682, the oil OL may flow into the oil path 21. In such a case, the pressure of the oil OL inside the oil path 21 between the check valve 91 and the electric oil pump EOP rises.

Here, when the electric oil pump EOP to which the oil path 21 is connected does not have a mechanism for relieving internal pressure to outside, and the pressure of the oil OL inside the oil path 21 rises, the pressure of the oil OL inside the oil path 23 also rises.

The oil path 23 connects the electric oil pump EOP and the strainer 10, and the check valve 18 is provided between the oil path 23 and the strainer 10 (see FIG. 9).

For that reason, the pressure rise in the oil path 21 due to the inflow of the oil OL from the control valve CV side causes a rise in the pressure of the oil OL inside the oil path 23.

In this embodiment, the oil path 231 constituting the oil path 23 has the connection port 99 that opens to the surface on the second chamber S2 side in the wall part 682. The relief valve 80 is provided in this connection port 99.

For that reason, when the pressure inside the oil path 23 exceeds the reference pressure, the oil OL in the third connection path 903 on the control valve CV side is discharged from the relief valve 80. As a result, the oil OL inside the oil path 23 is prevented from rising to the reference pressure or greater.

Here, when the connection port 99 is closed using a plug without providing the relief valve 80 in the connection port 99, the pressure inside the oil path 23 acts on the check valve 18 on the strainer 10 side.

As shown in FIG. 3, in the check valve 18, the other end 180*b* side of the cylindrical body part 180 is internally fitted in the connection part 625 on the barrier wall part 62 side. The seal ring S that is externally fitted on the outer periphery of the other end 180*b* of the body part 180 seals the gap between the outer periphery of the body part 180 and the inner periphery of the connection port 625*a* of the connection part 625.

When the pressure of the oil OL inside the oil path 23 (oil path 231) increases, the pressure acts on the seal ring S provided on the outer periphery on the other end 180*b* side of the body part 180. When that happens, an energizing force facing the one end 18*a* side (right side in the drawing) of the body part 180 acts on the seal ring S. As a result, there is a possibility of the seal ring S falling off from the recessed groove 181. If the seal ring S falls off to the position shown by the virtual line in the drawing, the gap between the outer periphery of the body part 180 and the inner periphery of the connection port 625*a* is opened. When the electric oil pump EOP is driven in this state, there is the possibility that air will be sucked in from the opened gap.

As noted above, in the present embodiment, the relief valve 80 is provided that discharges the oil OL inside the oil path 23 to outside when the pressure inside the oil path 23 exceeds the reference pressure in the oil path 23 (oil path 231). For that reason, it is possible to reduce the possibility of excessive pressure from being applied to the check valve 18 on the strainer 10 side. As a result, the possibility of having an effect on the sealing property of the check valve 18 on the strainer 10 side is suppressed.

As described above, the hydraulic circuit 20 according to the present embodiment has the following configuration.

(1) The hydraulic circuit 20 has:
the first oil path (oil path 21, first connection path 901) that links to the discharge port 71 of the electric oil pump EOP (first oil pump),
the second oil path (oil path 22, second connection path 902) that links to the discharge port 140 of the mechanical oil pump MOP (second oil pump),
the hydraulic control circuit 95 in which the line pressure regulator valve 951 (first regulator valve) is disposed downstream of the confluence point P of the first oil path (first connection path 901) and the second oil path (second connection path 902),
the oil path 23 (third oil path) that connects the suction port 72 of the electric oil pump EOP and the strainer 10,
the check valve 18 that is provided in the oil path 23 and restricts the movement of the oil OL toward the strainer 10 side, and
the relief valve 80 that is provided in the oil path 23 and discharges the oil OL in the oil path 23 to the outside when the pressure in the oil path 23 exceeds the reference pressure.

By configuring in this way, when the pressure inside the oil path 23 exceeds the reference pressure, the oil OL inside the oil path 23 is discharged from the relief valve 80 to outside, so it is possible to suppress a rise in pressure of the oil paths (oil path 23, oil path 21) on the electric oil pump EOP side.

(2) In the hydraulic circuit 20, there is a barrier wall part 62 (support wall) that supports the strainer 10.

The oil path 23 (third oil path) and the connection port 625a linked to the oil path 23 are provided on the barrier wall part 62.

The check valve 18 has a body part 180 that functions as a connection member that is internally fitted in the connection port 625a and links the strainer 10 and the oil path 23.

The seal ring S that seals the gap between the inner periphery of the connection port 625a and the outer periphery of the body part 180 is externally fitted on the outer periphery of the body part 180.

When the relief valve 80 is not provided, when the pressure inside the oil path 23 becomes high, the seal ring S is turned up by pressure, and it is possible for a gap to occur between the outer periphery of the body part 180 and the inner periphery of the connection port 625a. When the electric oil pump EOP is driven in that state, the air from the gap that occurred is sucked out, and it is possible that the discharge pressure of the electric oil pump EOP will become unstable.

As noted above, by the relief valve 80 being provided in the oil path 23, before reaching the pressure at which the seal ring S is turned up and a gap occurs, the oil OL inside the oil path 23 is discharged, and it is possible to reduce the pressure inside the oil path 23.

As a result, it is possible to reduce the possibility of a gap occurring between the outer periphery of the body part 180 and the inner periphery of the connection port 625a, and the destabilization of the discharge pressure of the electric oil pump EOP.

(3) In the hydraulic circuit 20, there is the control valve CV that has the hydraulic control circuit 95 inside.

The first oil path is configured from the oil path 21 on the barrier wall part 62 side (oil path on the support wall side), and the first connection path 901 on the control valve CV side (oil path on the control valve side).

The check valve 91 (first check valve) that restricts the movement of the oil OL to the electric oil pump EOP side is provided in the connection part between the oil path 21 and first connection path 901.

The first oil path (first connection path 901) and the second oil path (second connection path 902) are confluent inside the control valve CV, so when the mechanical oil pump MOP is driven, the pressure of the oil OL facing the electric oil pump EOP side acts on the check valve 91.

For that reason, the check valve 91 is provided and the movement of the oil OL to the electric oil pump EOP side is restricted, but when the pressure of the oil OL facing the electric oil pump EOP side becomes high, there is the possibility of the oil OL infiltrating the oil path 21. In that case, the pressure of the electric oil pump EOP side is higher than that of the check valve 91.

As noted above, the relief valve 80 is provided in the oil path 23 connected to the suction port 72 of the electric oil pump EOP, so it is possible to prevent the pressure on the oil path 23 side from reaching the reference pressure or higher.

(4) The barrier wall part 62 (support wall) has a wall part 682 (partition wall) that partitions the first chamber S1 in which the strainer 10 is disposed and the second chamber S2 in which the control valve CV is disposed.

The control valve CV is attached to the wall part 682.

The oil path 21 on the barrier wall part 62 (support wall part) side opens to the opposing part to the control valve CV in the wall part 682.

By configuring in this way, it is possible to connect the oil path 21 on the wall part 682 side and the first connection path 901 on the control valve CV side by the shortest distance. By the oil path 21 opening at the junction surface of the control valve CV in the wall part 682, it is possible to suppress leakage of the oil OL from the connection part of the oil path 21 and the first connection path 901.

(5) The check valve 91 has the valve body 915 having the abutting part 917 with a larger diameter than the opening diameter (inner diameter D211) of the oil path 211 on the barrier wall part 62 side.

The valve body 915 can be displaced in the axis line X91 direction along the opening direction of the oil path 21 (oil path 211).

The abutting part 917 of the valve body 915 contacts the peripheral edge surrounding the opening of the oil path 211 in the wall part 682 in a metal touch state, blocking the link between the oil path 21 (oil path 211) and the first connection path 901.

For that reason, when the pressure on the first connection path 901 side becomes high, there is a possibility that the oil OL can flow into the oil path 21 (oil path 211) through the contact interface between the abutting part 917 and the wall part 682.

In such a case, the pressure rises not only in the oil path 21 between the check valve 91 and the electric oil pump EOP but also inside the oil path 23 that connects the electric oil pump EOP and the strainer 10.

As noted above, when the pressure inside the oil path 23 exceeds the reference pressure, the oil OL inside the oil path 23 is discharged to outside by the relief valve 80, so it is possible to prevent a rise in the pressure inside the oil paths 21, 23 to the reference pressure or greater. As a result, by setting the reference pressure to a pressure that is lower than the pressure at which a gap occurs when the seal ring S of the check valve 18 turns up, it is possible to reduce the possibility of the pressure inside the oil paths 21, 23 from becoming too high and causing a gap between the outer periphery of the body part 180 of the check valve 18 and the inner periphery of the connection port 625*a*.

(6) In the oil path 23 (third oil path), the region more to the wall part 682 side than the intersection part with the oil path 232 in the oil path 231 serves as the branch passage 231' open in surface on the second chamber S2 side in the wall part 682 (partition wall).

The relief valve 80 is provided in the region of the branch passage 231' of the oil path 231.

By configuring in this way, by inserting the relief valve 80 in the branch passage 231' that opens in the second chamber S2, it is possible to dispose the relief valve 80 without obstructing the movement of the oil OL between the strainer 10 and the electric oil pump EOP.

(7) The discharge port 83*a* of the relief valve 80 is connected to the oil path 906 that constitutes to a drain circuit via the third connection path 903 inside the control valve CV.

The oil OL discharged from the discharge port 83*a* is used to capture the oil OL from the strainer 10.

For that reason, the discharge port 96 of the oil OL of the drain circuit is opened to a position suitable for the oil OL to return to the strainer 10. Thus, by linking the discharge port 83*a* of the relief valve 80 to the drain circuit, the oil OL discharged from the relief valve 80 can be discharged to a position suitable for the oil OL to return to the strainer 10. As a result, when the hydraulic circuit 20 is used in the power transmission device 1 for a vehicle, it is possible to suppress the amount of the oil OL stored inside the housing HS of the power transmission device 1. Thus, it is possible to expect an improvement in fuel consumption and electricity consumption of a vehicle in which the power transmission device 1 is mounted.

(I) The second oil path is configured from the oil path 22 on the barrier wall part 62 (support wall) side, and the second connection path 902 on the control valve CV side.

The check valve 92 (second check valve) that restricts the movement of the oil OL to the mechanical oil pump MOP side is provided on the connection part between the oil path 22 and the second connection path 902.

The check valve 92 has the valve body 925 having the abutting part 927 with a diameter larger than the opening of the oil path 22 that opens in the wall part 682. The valve body 925 can be displaced in the axis line X92 direction along the opening direction of the oil path 22.

The abutting part 927 of the valve body 925 contacts the peripheral edge surrounding the opening of the oil path 22 in the wall part 682 in a metal touch state, and blocks the link between the oil path 22 and the second connection path 902.

For that reason, when the mechanical oil pump MOP is not being driven, even if the electric oil pump EOP is driven, it is possible to obstruct the inflow into the oil path 22 of the oil OL that flowed into the second connection path 902 from the first connection path 901 side.

(II) Viewed from the vehicle front side of the power transmission device 1, the connection port 97 of the oil path 21, the connection port 98 of the oil path 22, and the connection port 99 of the oil path 23 are disposed aligned in the vertical direction in the region overlapping the barrier wall part 62 in the wall part 682 (see FIG. 7).

In the wall part 682, the connection ports 97, 98, 99 are disposed in a positional relationship overlapping the control valve CV.

The region overlapping the barrier wall part 62 in the wall part 682 is a region of high rigidity in the case 6. When the connection ports 97, 98 are opened in this region, it is possible to ensure stability when abutting the valve bodies 915, 925 on the peripheral edge of the opening of the connection ports 97, 98. As a result, it is possible to reliably close the openings of the connection ports 97, 98 with the valve bodies 915, 925.

It is possible to simultaneously install the control valve CV in the second chamber S2 and complete the connection between each connection path on the control valve CV side (first connection path 901, second connection path 902, third connection path 903) and the connection ports 97, 98, 99.

In the embodiment noted above, an example is shown in which the connection port 99 of the base end side of the oil path 231 opens at a position opposing the control valve CV, and the oil OL discharged from the relief valve 80 provided in the connection port 99 is discharged to the third connection path 903 on the control valve CV side. The oil OL discharged from the relief valve 80 may also be directly discharged into the second chamber S2 that houses the control valve CV or in the first chamber S1.

In the embodiment noted above, an example was shown in which, as shown in FIG. 7, viewed from the vehicle front side of the power transmission device 1, the connection port 97 of the oil path 21, the connection port 98 of the oil path 22, and the connection port 99 of the oil path 23 are disposed in the vertical direction in the region overlapping the barrier wall part 62 in the wall part 682.

These connection ports 97, 98, 99 do not absolutely have to be disposed aligned in the vertical direction in the region overlapping the barrier wall part 62. This can be suitably changed according to the disposition of the connection path on the control valve CV side.

In the embodiment noted above, an example is shown of a case when the power transmission device 1 transmits the rotation of the engine ENG to the drive wheels WH, WH, but it is also possible to have the power transmission device 1 transmit the rotation of at least one of the engine ENG and a motor (rotary electric machine) to the drive wheels WH, WH. For example, it is also possible to be a 1-motor, 2-clutch type power transmission device (a type in which the motor is disposed between the engine ENG and the power transmission device, a first clutch is disposed between the engine ENG and the motor, and a second clutch is disposed inside the power transmission device 1).

In the embodiment noted above, an example was shown when the power transmission device 1 has a gear shift function, but it is also possible to be an item in which the power transmission device does not have a gear shift function, and simply decelerates (can also be acceleration). In a case when the power transmission device does not have a gear shift function, and the power transmission device is configured to decelerate the rotation of the motor and transmit that to the drive wheels WH, WH, the hydraulic control circuit for supplying the oil OL for cooling the motor and the oil OL for lubricating the deceleration mechanism is disposed in the electric oil pump EOP and also the second chamber S2. In the embodiment noted above, an example was shown of when the control unit of the power transmission device 1 is provided with the control valve CV, but it is also possible to have the power transmission device 1 not have a gear shift mechanism, and when the drive source is a motor (rotary electric) rather than the engine ENG, to be a control unit provided with an inverter, etc., that controls driving of the motor.

The present invention can be applied to other than vehicles.

An embodiment of the invention of the present application was explained above, but the abovementioned embodiment is nothing more than one application example of the present invention, and the technical scope of the present invention is not restricted to the specific configuration of the abovementioned embodiment. Changes can be made as appropriate within the scope of the technical concept of the invention.

EXPLANATION OF CODES

6: Case; 10: Strainer; 18: Check valve; 20: Hydraulic circuit; 21: Oil path (first oil path: oil path on the support wall side); 22: Oil path (second oil path); 23: Oil path (third oil path); 62: Barrier wall part (support wall); 71: Discharge port; 72: Suction port; 80: Relief valve; 91: Check valve (first check valve); 95: Hydraulic control circuit; 99: Connection port (relief valve discharge port); 140: Discharge port; 180: Body part (connection member); 211: Oil path (second oil path: oil path on the support wall side); 212: Oil path (first oil path); 231: Oil path (third oil path); 231: Branch passage; 232: Oil path (third oil path); 625a: Connection port; 682: Wall part (partition wall); 901: First connection path (first oil path: oil path on the control valve side); 902: Second connection path (second oil path); 906: Oil path (drain circuit); 917: Abutting part; 951: Line pressure regulator valve (first regulator valve); CV: Control valve; EOP: Electric oil pump (first oil pump); MOP: Mechanical oil pump (second oil pump); OL: Oil; P: Confluence point; S: Seal ring; S1: First chamber; and S2: Second chamber.

The invention claimed is:
1. A hydraulic circuit comprising:
a first oil path that links to a discharge port of a first oil pump;
a second oil path that links to a discharge port of a second oil pump;
a hydraulic control circuit in which a first regulator valve is disposed downstream of a confluence point of the first oil path and the second oil path;
a third oil path that connects a suction port of the first oil pump and a strainer;
a check valve that is provided in the third oil path and restricts a movement of oil toward the strainer side; and
a relief valve that is provided in the third oil path and discharges oil in the third oil path to an outside when a pressure in the third oil path exceeds a reference pressure.

2. The hydraulic circuit according to claim 1, further comprising
a support wall that supports the strainer, wherein
the third oil path and a connection port linked to the third oil path are provided on the support wall,
the check valve has a connection member that is internally fitted in the connection port and links the strainer and the third oil path, and
a seal ring that seals a gap with an inner periphery of the connection port is externally fitted on an outer periphery of the connection member.

3. The hydraulic circuit according to claim 2, comprising
a control valve that has the hydraulic control circuit inside, wherein
the first oil path is configured from an oil path on the support wall side, and an oil path on the control valve side, and
a first check valve is provided in the connection part of the oil path on the support wall side and the oil path on the control valve side.

4. The hydraulic circuit according to claim 3, wherein
the support wall has a partition wall that partitions a first chamber in which the strainer is disposed and a second chamber in which the control valve is disposed,
the control valve is attached to the partition wall, and
the oil path on the support wall side opens in an opposing part to the control valve in the partition wall.

5. The hydraulic circuit according to claim 4, wherein
the first check valve has a valve body with a larger diameter than an opening diameter of the oil path on the support wall side, and
the valve body can be displaced in an opening direction of the oil path on the support wall side.

6. The hydraulic circuit according to claim 4, wherein
the third oil path has a branch passage open in the partition wall, and
the relief valve is provided in the branch passage.

7. The hydraulic circuit according to claim 1, wherein
a discharge port of the relief valve is linked to a drain circuit.

* * * * *